United States Patent [19]

Grieb

[11] Patent Number: 4,909,031
[45] Date of Patent: Mar. 20, 1990

[54] COMBINED MULTI-SPEED JET ENGINE FOR THE DRIVE OF AIRPLANES AND SPACE VEHICLES

[75] Inventor: Hubert Grieb, Germering, Fed. Rep. of Germany

[73] Assignee: Mtu Motoren- und Turbinen-Union Munchen GmbH, Fed. Rep. of Germany

[21] Appl. No.: 199,901

[22] Filed: May 27, 1988

[30] Foreign Application Priority Data

May 27, 1987 [DE] Fed. Rep. of Germany ....... 3717968
Nov. 14, 1987 [DE] Fed. Rep. of Germany ....... 3738703

[51] Int. Cl.$^4$ ............................ F02K 7/16; F02K 7/18
[52] U.S. Cl. .......................................... 60/225; 60/244; 60/270.1
[58] Field of Search ...................... 60/39.162, 224, 225, 60/226.1, 226.3, 244, 245, 263, 270.1

[56] References Cited

U.S. PATENT DOCUMENTS

| | | |
|---|---|---|
| 2,635,420 | 4/1953 | Jonker . |
| 2,672,726 | 3/1954 | Wolf et al. ............... 60/226.1 |
| 2,952,973 | 9/1960 | Hall et al. ............... 60/270.1 |
| 3,161,018 | 12/1964 | Saudre ............... 60/270.1 |
| 3,238,716 | 3/1966 | Sandre ............... 60/263 |
| 3,296,800 | 1/1967 | Keenan et al. ............... 60/270.1 |
| 3,432,100 | 3/1969 | Hardy et al. ............... 60/244 |
| 4,137,708 | 2/1979 | Aspinwall et al. ............... 60/224 |
| 4,185,457 | 1/1980 | Parker et al. ............... 60/270.1 |
| 4,543,785 | 10/1985 | Patrick . |

FOREIGN PATENT DOCUMENTS

| | | |
|---|---|---|
| 819032 | 8/1959 | United Kingdom . |
| 875496 | 8/1961 | United Kingdom . |
| 1338347 | 11/1973 | United Kingdom . |
| 2155110 | 9/1985 | United Kingdom . |
| 2190964 | 12/1987 | United Kingdom . |

OTHER PUBLICATIONS

*The Jet Engine;* Publication, 1986, pp. 54, 16, and 53.

*Primary Examiner*—Louis J. Casaregola
*Attorney, Agent, or Firm*—Barnes & Thornburg

[57] ABSTRACT

Composite changeover-type reaction power plant for propelling aircraft and spacecraft operating in subsonic, supersonic and hypersonic regions, embracing a turbofan bypass engine with front fan, and a ramjet engine with a cycle corresponding to that of the fan, where the fan has individually independently supported, operationally counterrotating statorless rotors and variable fan blades which are feathered and immobilized during ramjet operation for low drag during said ramjet operation.

22 Claims, 8 Drawing Sheets

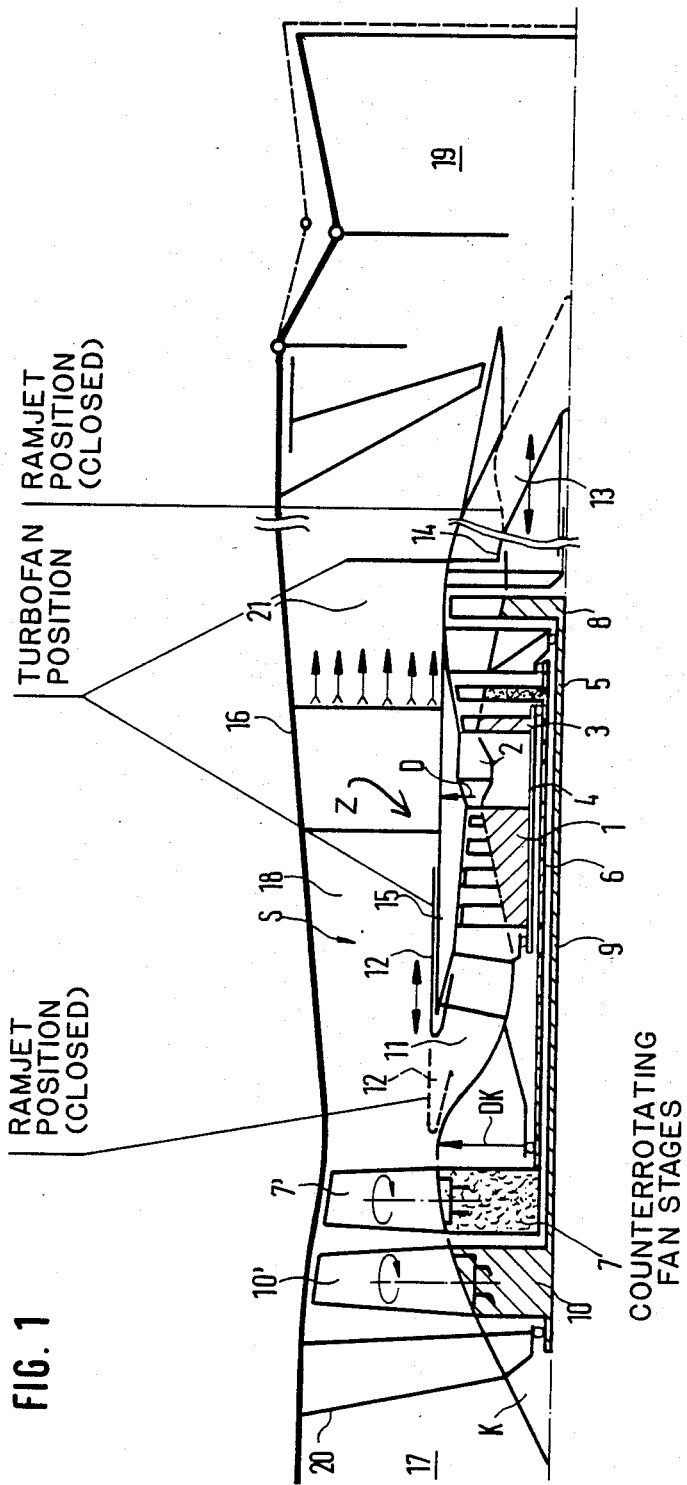

$W_1, W_2$ — 1ST ROTOR CASCADE
$W_1', W_2'$ — 2ND ROTOR CASCADE
$C_1$ — ENTRY, 1ST ROTOR CASCADE
$C_2'$ — EXIT, 2ND ROTOR CASCADE

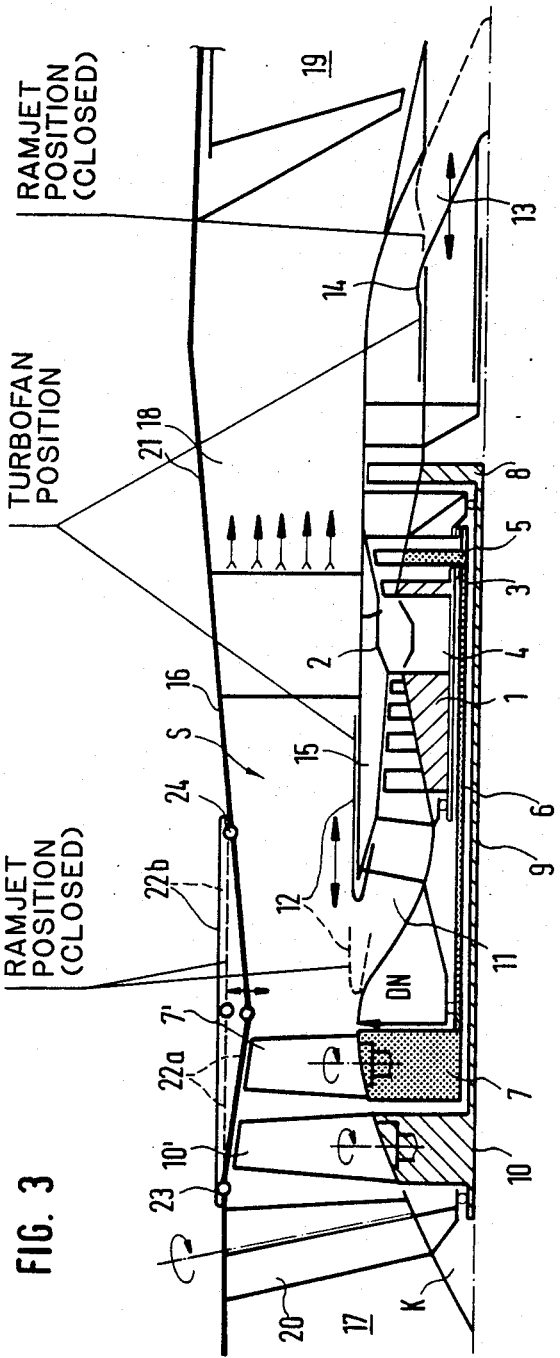
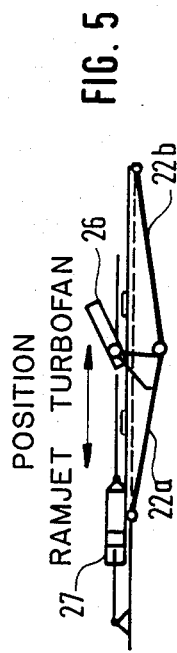

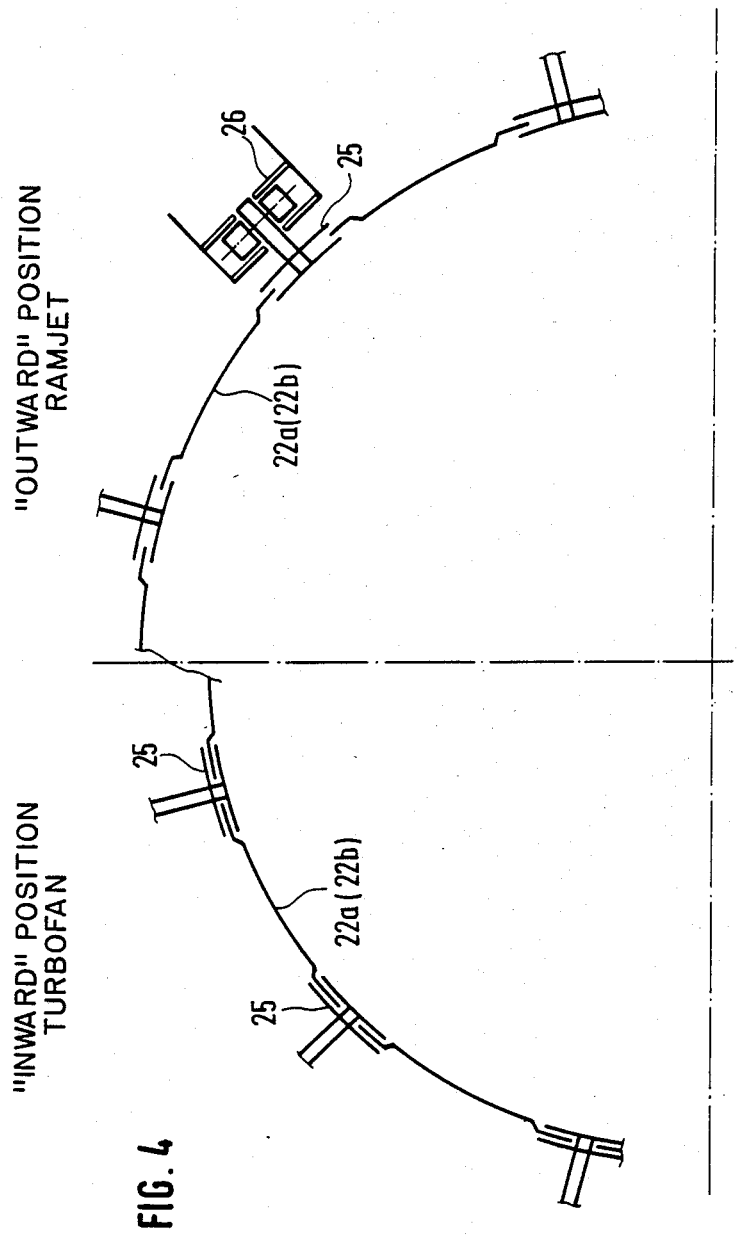

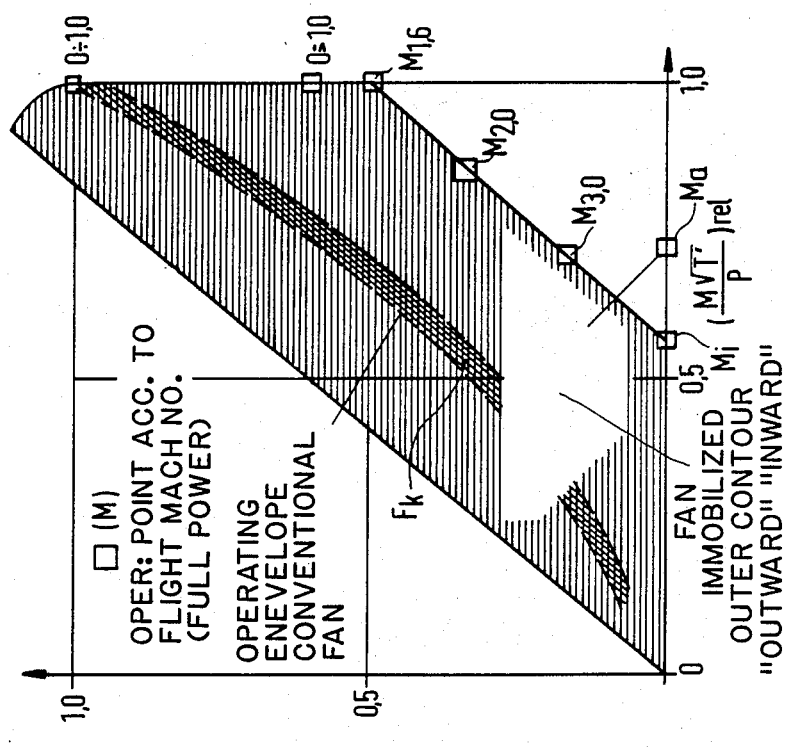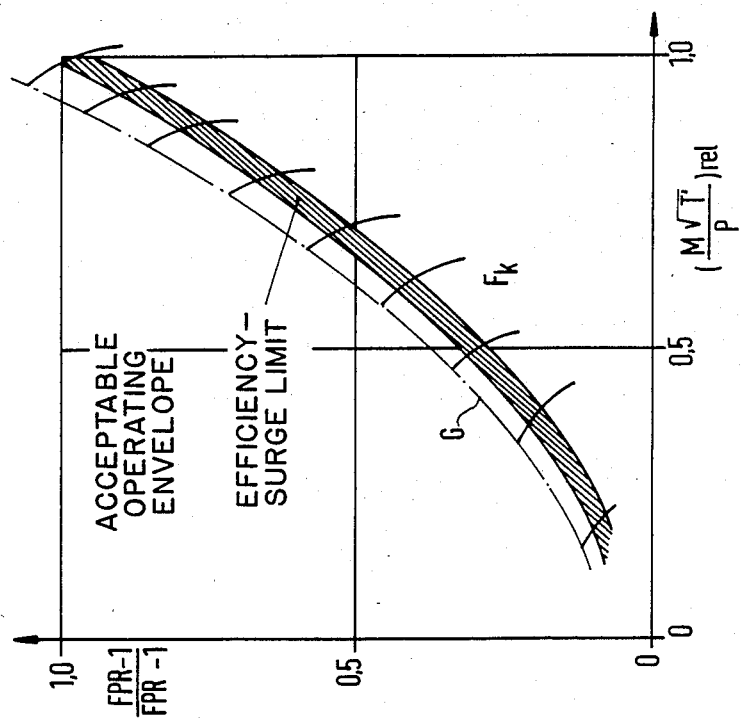

COMBINED MULTI-SPEED JET ENGINE FOR THE DRIVE OF AIRPLANES AND SPACE VEHICLES

BACKGROUND AND SUMMARY OF THE INVENTION

This invention relates to a composite changeover-type reaction power plant which can be selectively operated as a turbofan engine and a ramjet engine utilizing a common annular bypass ramjet air passage duct.

Historically aircraft have been developed to give increasingly high performance and speeds reaching well into the hypersonic regime. Currently available propulsion systems are incapable of optimally serving the sweeping performance and speed ranges. Propeller engines, for instance, have large mass flows which make them desirable for short take-off and landing distances, and they give good efficiency at relatively slow airspeeds and in relatively low performance ranges, whereas pure jet engines give high thrust performance with high specific thrust levels and ensure relatively high air speeds at satisfactory efficiency. Maximum flight speeds in the hypersonic range, however, cannot be achieved with airbreathing solutions, except for ramjets whose specific thrusts and power weight ratios are extremely high, but whose efficiencies are substantially poorer especially at relatively low airspeeds. For physical and technical reasons it is impossible to have a single engine type optimally satisfy all flight requirements from takeoff to satisfactory climb and cruise speeds all the way to high and ultrahigh speeds.

This called for the development of composite changeover-type powerplants which, as described for the known experimental "Griffon" aircraft (Flug Revue International, January 1967, p. 15), comprise a central turbojet engine and enveloping it, a supersonic-intake ramjet engine, where the turbojet engine is used for take-off and landing flight conditions and for the low-speed range, while the ramjet engine is used to achieve high air speeds. In an attempt to achieve still improved conditions at take-off and landing conditions and also at low airspeeds, published engine studies like that of the above-mentioned literature reference illustrated in FIG. 3 use a turbofan or bypass engine arranged centrally inside a ramjet engine, where use is made of a low-pressure front fan engine to provide the second cold cycle, said front-fan engine having corotating compressor stages and being driven by a low-pressure turbine of the core engine's compressor drive turbine. Bypass engines provide an advantage in that they augment the air or mass flow. The turbofan nevertheless is adversely affected also by disadvantages when deactivated during ramjet operation, i.e., with a fan of conventional construction having corotational compressor stages and intervening fixed stator cascades, appreciable power losses are expected even when extensive use is made of variable-geometry stator cascades when on the one hand, effective use shall be made of the flow capacity of the annulus in the fan area and when on the other hand, high pressure losses caused by flow separation in the various cascades shall be avoided. This is because in fans of conventional construction, there is a close relationship between fan speed and mass flow, so that by the same token, also power absorption can be influenced within narrow limits only.

Fans of conventional construction, even when fitted with variable-geometry banes, are also characterized by the fact that at the reduced speeds $N/\sqrt{T}$, which are lowered at high flight mach numbers, especially in the hypersonic region, despite maximum circumferential speeds, the level of the axial mach numbers and, thus, also the reduced flow $$\frac{M \cdot \sqrt{T}}{P}$$

decreases. Since the mach numbers at the compressor exit and the afterburner inlet show a fixed interrelationship, the compressor in the ramjet engine represents an extreme obstacle to the full utilization of the available flow area in the afterburner in the interest of maximum allowable mach numbers or maximum flow.

The disadvantages inherent in previously disclosed versions of composite powerplants combining turbofans with ramjets can be summarized such that, one, fan engines of conventional construction produce no satisfactory engine powers and efficiencies at high supersonic air speeds and that, two, these fan engines, when shut down during ramjet operation, constitute a notable obstacle to the flow that prevents the full utilization of the available flow area in the ramjet cycle in the interest of maximum allowable flow mach numbers and maximum flow.

In a broad aspect of the present invention the disadvantages affecting composite powerplants comprising of a turbofan engine and a ramjet engine, with conventional fans, are eliminated and measures are proposed to conceptually improve such composite engines such that at the same motor conditions or the same design values and conditions for both individual engines, power and efficiency can be improved.

It is a particular object of the present invention to provide a composite powerplant of the general type described above with the inlet compressor stages formed of counterrotating blade stages without intervening fixed stator vanes. A fundamental advantage provided by a fan with counterrotating statorless rotors and with fan blades capable of rotation about their longitudinal axis, is that at axial inlet flow and simultaneously axial outlet flow the blades of the 1st and the 2nd rotors can be positionally varied such that at a certain speed, pressure ratio and flow can be detached one from the other to a considerable degree (cf. FIG. 9). This amount of flexibility can additionally be improved by the use of a variable inlet stator cascade upstream of the first compressor rotor, which also serves to improve afflux conditions for both rotor stages in the interest of optimum fan efficiency and functioning.

An advantage obtained in this manner over conventional engines in that the composite powerplant arranged in accordance with the present invention enables acceptable noise levels to be achieved during take-off and climb. In this respect it is assumed in the interest of noise attenuation that take-off and initial climb to about 4 km in altitude at mach numbers around 0.6 will be in the dry turbofan configuration, with the fan pressure ratio being limited to values around 2.2 to 2.4. But when the noise attenuation requirement is obviated—e.g. when climbing to higher altitudes—the engine geometry can be adjusted for a high fan pressure ratio in the 3.5 to 4.0 range to achieve high specific thrust in dry or heated operation at favorable specific fuel consumption.

When the fan blades are feathered during ramjet operation, their drag and the pressure drop in that area is appreciably reduced. Another special potential for optimizing flow conditions in the ramjet rests in the fact that the core engine practically lies in the cross-sectional shade of the fan engine hub. This is again benefited by the fact that counter-rotating statorless compressors generally have their optimum efficiency at greater deliveries than do conventional compressors, i.e., at given peripheral speeds in the range of greater axial velocities, so that compared with conventional compressors, greater axial flow densities or greater flows at a given area are achieved at aerodynamically and/or mechanically allowable peripheral speeds. Also, the variable fan blades make it possible to vary the axial velocities over a wide range while maintaining the zero-swirl reflux, so that especially at off-design load, i.e. at reduced peripheral speeds, the axial fluid density does not not necessarily drop as heavily as with conventional compressors. Also, the high air flow necessitated by the feathered pitch of the fan blades particularly above the changeover point, i.e., in the mach 2.5 to 3.0 range, makes for lower specific thrust at a given thrust requirement and a given cross-sectional engine area, i.e., in conjunction with adequate reheating at lower nozzle temperatures, for substantially lower fuel consumption.

A further advantage afforded by the fan engine arranged in accordance with the present invention is that in hypersonic ramjet operation, i.e., also above the above-mentioned changeover point, the same mach number level can conceptually be reached as in subsonic operation, i.e., maximally 0.2 to 0.3 at the flameholder inlet, while when using a conventional fan the mach number level would be restricted to about 0.10 with accordingly low flow level.

The aerodynamic design of a fan engine with the usual pressure ratio around 2.5 to 3.5 requires considerable constriction of the flow passage towards the fan exit, so that this produces a throat, as it were, which may well be favorable for fan operation, but adversely affects ramjet operation. Viewed in more detail the problem presents itself thus: conceptually the composite power plant of the present invention with its fixed duct structure in the area of the fan and the downstream flow passage with afterburner and variable convergent-divergent nozzle, can effectively be operated also as a ramjet engine, if the flow areas are attuned such that in turbofan operation, favorable mach numbers are achieved at the fan inlet and exit and at the flameholder inlet. In this context, mach numbers around 0.7 at the fan inlet, 0.5 to 0.6 at the fan exit and 0.2 at the flameholder inlet, e.g., can be considered normal values. It may prove favorable, however,—especially in LH$_2$—based ramjet operation—to increase thrust by maximizing flow in the high mach number regime above the changeover point, i.e. at high inlet temperatures with correspondingly moderate temperature rise in the afterburner, such that a mach number in the 0.3 to 0.4 range is allowed at the flameholder inlet. In this case the mach numbers at the exit of the deactivated fan with fixed outer contour would rise tremendously, so that high pressure losses would ensue in the downstream flow passage.

If in this case, i.e., above the changeover point, it is intended to optimize the overall system comprising the intake, flow passage between fan inlet and flameholder inlet, after-burner and nozzle towards maximum flow or thrust, it is proposed in accordance with preferred embodiment of the present invention that the engine outer casing is designed such that when the composite power plant is operated in the ramjet mode, the cross-sectional areas of the flow passage at the fan exit can be greatly widened.

Blocking the core engine at its air intake and nozzle to seal it from the flow passage of the ramjet engine—as it is intended in accordance with the present invention during ramjet operation—serves to protect the deactivated core engine and fan plus associated blades from overheating by hot gases penetrating from the ramjet duct. This produces—with respect to the core engine plus fan, a virtually closed space which at higher flight mach numbers is internally swept by a cooling gas of a suitable temperature and of a pressure that is slightly higher than that of the externally located flow passage of the ramjet engine. The effectiveness of environmental control provisions for the core engine plus fan naturally depends on what the bearing lubrication concept looks like, which materials are used, and which coolant is employed. It should in any case be possible—up to mach numbers around 2.2 to 2.4—to make do with a conventional air system that does not require artificial cooling of the cooling air to be tapped from the engine, especially so as bearing chamber temperatures of about 250° C. are considered allowable. At higher mach numbers, which at once correspond to ramjet operations, air may still be the proper coolant, but will have to be cooled down to allowable temperature in a chiller. Since the amounts of air needed for environmental control of the core engine plus fan—enough to neutralize the heat input from the flow around the core engine—are relatively small, the cooling effort will remain in acceptable limits. Conceptually, there may naturally be alternative cooling systems that may lend themselves—e.g. when LH$_2$ is used —to use for the present concept of counterrotating variable fan in ramjet operation with sealed core engine as here described.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal schematic sectional view which illustrates a composite powerplant including a three-spool turbofan bypass engine and a ramjet engine, constructed in accordance with a preferred embodiment of the invention;

FIG. 3 illustrates a composite power plant as in FIG. 1, but with variable engine outer casing in the fan area, using pivotally connected flap petals, constructed according to a preferred embodiment of the invention;

FIG. 4 illustrates the movable petals of FIGS. 3 and 5 in sectional view normal to the engine centerline;

FIG. 5 illustrates the actuating device for the petals of FIG. 3;

FIG. 9a illustrates the characteristics of a conventional fan; and

FIG. 9b illustrates the operating envelope of the composite power plant arranged in accordance with the present invention, together with the characteristics of a conventional fan in accordance with FIG. 9a.

DETAILED DESCRIPTION OF THE DRAWINGS

Figure 2A:
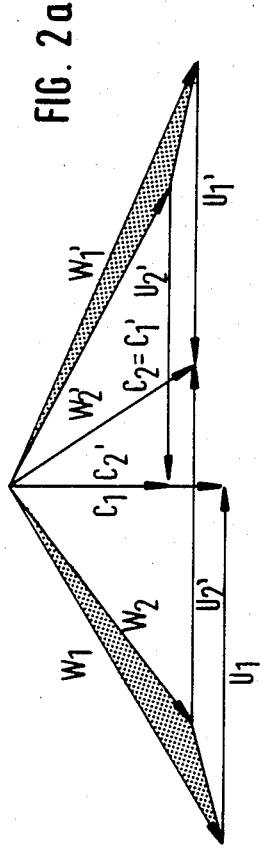
FIG. 2a shows a velocity triangle of a two-rotor, counter-rotating turbofan at full power.

With reference now to FIG. 1 the composite power plant here illustrated consists of a turbofan bypass engine Z and a ramjet engine S. The turbofan engine Z is a three-spool design having a high-pressure compressor 1, driven by a high-pressure turbine 3 downstream of a combustion chamber 2 through a first shaft 4. An intermediate—pressure turbine 5 drives—through a second shaft 6—a second fan rotor 7 (looking aft), and a low-pressure turbine 8 drives—through a third shaft 9—a first fan rotor 10. The air intake 11 for the high-pressure compressor 1 can be sealed with a translating sleeve valve 12, and the nozzle 13 for the exhaust gases from the low-pressure turbine 8 can be sealed with a translating nozzle cone 14. The major engine components 1, 2, 3, 5, 8, 11 and 13 form a core or basic engine with an engine shroud 15 of a diameter D. The hub section of the turbo fan engine is indicated with the letter K and has a maximum diameter DK which practically matches diameter D of the engine shroud 15. The rear convergent portion of the fan hub section K is followed by the air intake 11 in continuation of the contour.

Extending between the engine outer casing 16 and the engine shroud 15 is the second cycle of the composite power plant with an air intake 17, a flow passage 18, a ramjet combustion chamber 21' with fuel injection grid 21, and a rearward variable exhaust nozzle 19. This second thrust cycle serves in alternation both the ramjet engine S and the turbofan engine with its two low-pressure compressor stages of a pressure ratio in the 2.5 to 3.5 range. The two rotors 10 and 7 carry blades that can rotatably be adjusted about their longitudinal axes and that are preceded by an inlet stator cascade 20.

Figure 2B:
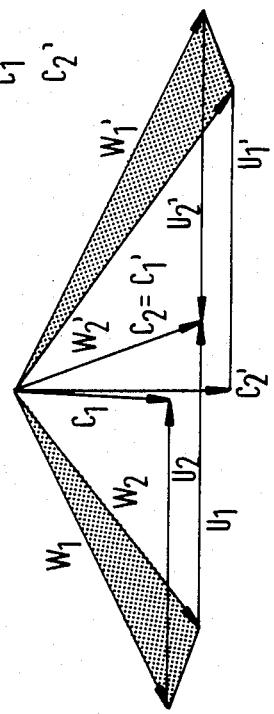
FIG. 2b shows a velocity triangle of the same turbofan at off-design power.

FIGS. 2a and 2b conventionally illustrate the velocity triangles of the two counter-rotating rotors 10 and 7 without intervening stator cascade at axially directed afflux and efflux flows: in FIG. 2a at full power, and in FIG. 2b at off-design power, where W1 and W2 indicate the relative velocities in the first rotor cascade, W1' and W2' the relative velocities in the second rotor cascade, C1 the axial inlet velocity to the first rotor cascade and C2' the axial exit velocity from the second rotor cascade. Additionally, C2 indicates the axial exit velocity from tee first rotor cascade and C1' the axial inlet velocity to the second rotor cascade, and U1 and U2 indicate the peripheral speeds of the first rotor 10, and U1' and U2' the peripheral speeds of the second rotor 7.

At full power operation in subsonic flight (high $N/\sqrt{T}$) the prevailing pressure ratio is high and the axial velocity C2' decreases towards the exit. At off-design operation in subsonic flight, or full power operation in supersonic flight (low $N/\sqrt{T}$), the prevailing pressure ratio is low and the axial velocity C2' increases towards the exit.

The rotor blades can be adjusted accordingly.

The characteristics $F_k$ shown in FIG. 9a of a conventional fan are represented in a chart, where the relative mass flow $$\left( \frac{m \cdot \sqrt{T}}{p} \right)$$

rel of the air delivered by the fan blades is plotted on the abscissa, and the pressure ratio of the fan referred to it pressure ratio at a design point A is plotted on the ordinate, where C indicates the surge limit of the fan.

The operating envelope of FIG. 9b of a fan arranged in accordance with the present invention with counter-rotating rotors 10 and 70 and variable blades 10' and 7' is plotted in the same chart as that of FIG. 9a. Shown in the operating envelope $F_{erf}$ are the full-power operating points $M_{1.6}$, $M_{2.0}$, $M_{3.0}$, etc., at various flight mach numbers M in the climb phase for both turbofan operation and ramjet operation with immobilized fan. The characteristics $F_k$ of the conventional fan, here shown additionally, underscores the flexibility achieved with the fan of the present invention with respect to its advantageous functional operation.

The two designations $M_i$ and $M_a$ indicated on the abscissa mark the operating points that in accordance with the present invention are achieved with variable petals 22a and 22b for the engine outer casing 16 (FIG. 3). $M_i$ indicates petal position "inward" and $M_a$ petal position "outward".

As illustrated in FIGS. 3, 4 and 5 the engine outer casing 16 has, in the area of turbofan 10, 7 and behind it, a front row of petals 22a and a rear row of petals 22b pivoted to the engine outer casing 16 through front pivots joints 23 and rear pivot joints 24. The petals 22a and 22b are centrally connected through slide shoes 25 which permit of radially outward and inward movement under the control of cam and roller track arrangements 26. These arrangements are operated by a hydraulic actuator 27.

The composite powerplant operates as follows: For aircraft take-off maneuvers, or for a near-earth propulsion stage of a spacecraft, the system operated first is the turbofan bypass engine Z, with the sleeve valve 12 being retracted to open the air intake 11 for the core engine, and the exhaust nozzle cone 14 being in its position to open also the nozzle 13 of the core engine. Additionally the front petals 22a and the rear petals 22b are positioned inward to form a convergent-divergent flow section for the second thrust cycle, or fan cycle, which is now being used by the fan engine as a code flow cycle or, with reheating, as a second hot thrust cycle.

If it is intended to use the near-earth propulsion stage to propel the aircraft or spacecraft to higher mach speeds (above 2.5 to 3.0), the changeover is made to ramjet operation, with the turbofan engine deactivated. The air intake 11 is now sealed by deploying the sleeve valve 12 forward, the air inlet of the nozzle 13 is sealed by retracting the nozzle cone 14, and the fan blades 10' and 7' are feathered with the rotors 10 and 7 immobilized. Additionally, the petals 22a and 22b are positioned outward to give the flow passage 18 in the fan engine area an approximately cylindrical shape to boost the flow capacity and, thus, the efficiency of the ramjet engine as previously explained in more detail.

Figure 6:
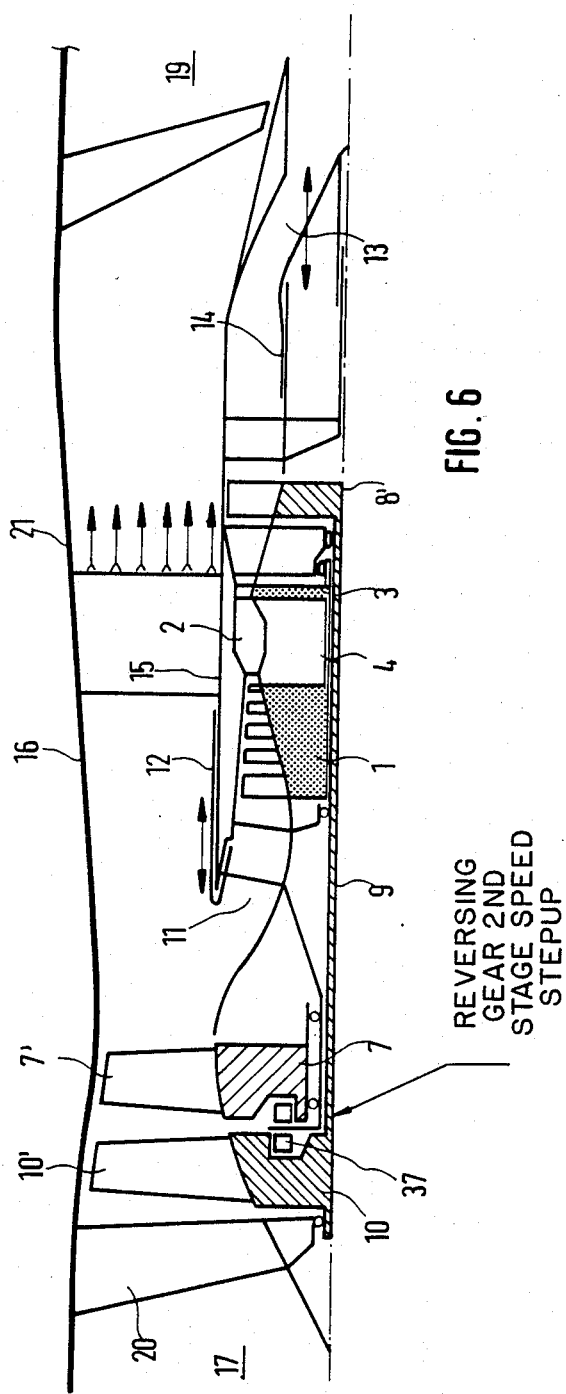
FIG. 6 illustrates a composite power plant including a two-spool turbofan with a reversing gearbox between a first and a second fan rotor, constructed according to another preferred embodiment of the invention.

In FIG. 6 the turbofan engine is designed as a two-spool engine, where the high-pressure turbine $3_A$ drives the high-pressure compressor $1^A$ of the core engine, and the low-pressure turbine $8'^A$ drives the first rotor $10^A$ of the fan engine. The second rotor $7^A$ is driven in counter-rotation and if desirable, at higher speeds through an intermediate reversing and change-speed gear 37. The remaining parts of the FIG. 6 embodiment have been designated with reference numbers having a suffix "A" but otherwise similar to these for corresponding functioning parts of the embodiment with FIGS. 1–5.

Figure 7:
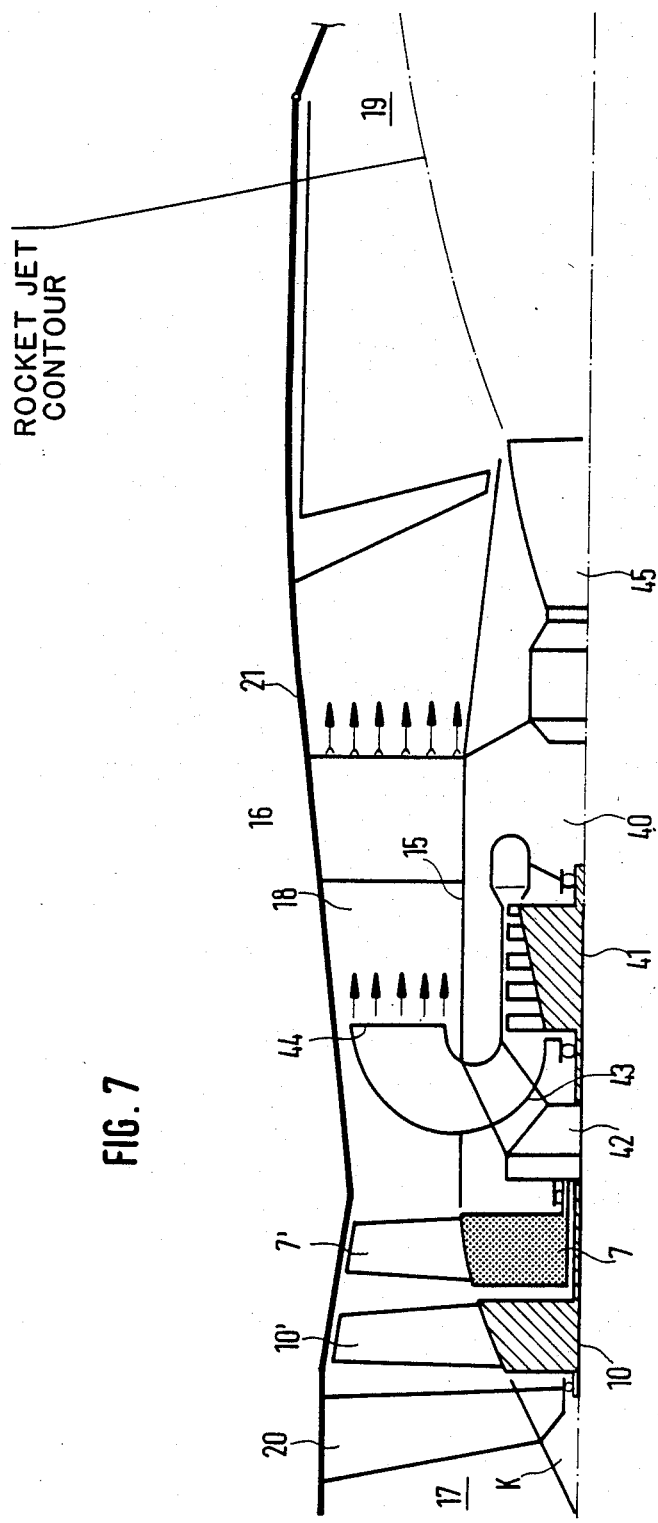
FIG. 7 illustrates a composite powerplant including a turbofan with a single-spool rocket turbine engine with a downstream reversing gearbox, and of a rear rocket engine, constructed according to another preferred embodiment of the invention.

FIG. 7 illustrates a composite changeover-type power plant comprising of a rocket turbine engine with a gas-generator rocket combustion chamber 40. The gas-generator chamber 40 provides propulsion gases to drive a multistage gas turbine 41 driving a reversing and change-speed gear mechanism 42. Gear mechanism 42 operatively drives two counter-rotating fan rotors $10^B$ and $7^B$, where the rear rotor 7, as desired, revolves at higher speeds. The remaining parts of the FIG. 7 embodiment have been designated with reference numbers having a suffix "B" but otherwise similar to those for correspondingly functioning parts with the embodiment of FIGS. 1–5. The turbine exhaust gases are ducted, through an elbow 43, to a segmented exit port 44 issuing into the second flow passage $18^B$. With the rocket turbine engine shut down the second thrust cycle again operates as a ramjet engine. For missions in airvoid space, a rocket engine 45 is additionally provided.

Figure 8:
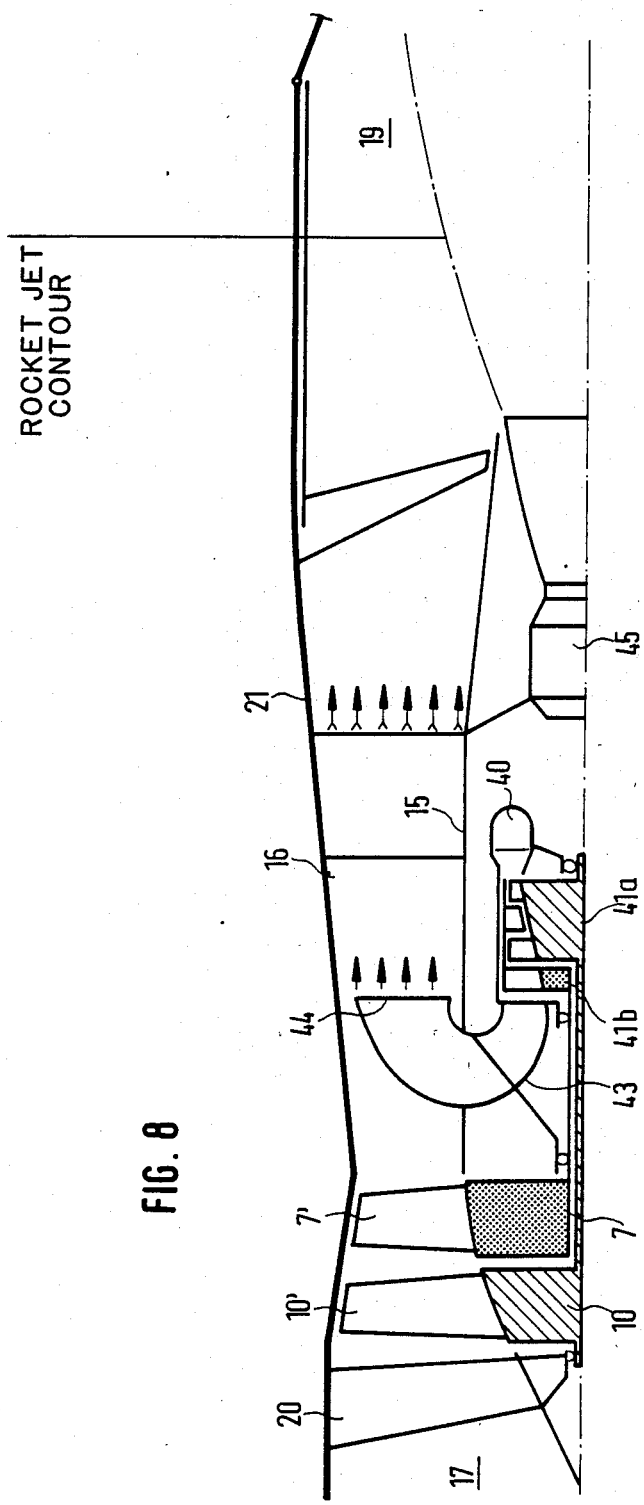
FIG. 8 illustrates a composite power plant arranged in accordance with FIG. 7, except for a counterrotating two-spool rocket turbine engine.

FIG. 8 illustrates the same composite power plant as shown in FIG. 7, except that the place of a single-spool turbine is taken by a two spol counterrotating turbine, i.e. its inner rotor 41a serves to drive the first fan rotor 10, and its outer rotor 41b the second, counterrotating fan rotor 7. The remaining parts of the FIG. 8 embodiment have been designated with reference numbers having suffix "C" but otherwise similar to those for correspondingly functioning parts of the embodiment of FIGS. 1–5.

Owing to their higher power weight rotor and their additional rocket engine 45 the two composite power plants illustrated in FIGS. 7 and 8 are suited for the propulsion of orbital transports. The segmented exit ports 44 are configured to minimize disturbance of the ramjet operational mode.

The inventive concept satisfies the objective of optimally utilizing the cross-sectional areas of the engine in both turbofan and ramjet operation, i.e. with maximum mass flow at minimum loss for maximum thrust at minimum fuel consumption for given lateral engine dimensions. Reheat selection here depends on specific thrust requirements and the demands regarding specific fuel consumption.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Composite changeover-type reaction powerplant for propelling aircraft and spacecraft at both subsonic and super/hypersonic speeds, comprising selectively operable core engine means and ramjet engine means,
wherein said core engine means includes turbine means and a multistage turbofan compressor driven by the turbine means and serving to supply compressed air to a bypass flow duct surrounding the turbin means and forming a portion of a cool gas cycle,
wherein said ramjet engine means is coaxially disposed around the core engine means, said bypass flow duct of the core engine means serving as part of a ramjet air inlet means when operating as a ramjet engine with deactivation of the core engine means,
wherein said multistage turbofan compressor includes a pair of separately supported operationally counterrotating fan blade units without any intervening stator blade units therebetween, and wherein means are provided for feathering and immobilizing the fan blades of the fan blade units during ramjet engine operation of the powerplant.

2. Powerplant according to claim 1, wherein
said core engine is a turbofan core engine which includes coaxially arrange combustion chamber means air inlet means for supplying air to the combustion chamber means with flow through the air inlet means and the combustion chamber means forming a hot gas cycle,
wherein the turbine means is driven by exhaust gas from the hot gas cycle,
wherein the turbofan compressor serves to supply compressed air to the air inlet means, and
wherein the bypass flow duct surrounds the combustion chamber means.

3. Powerplant according to claim 2,
wherein the air inlet means is disposed downstream of the counterrotation fan blade units and wherein,
movable valve means are provided for selectively closing the air inlet means during ramjet engine operating conditions.

4. Powerplant according to claim 3, wherein
the turbofan core engine means includes an exhaust nozzle disposed downstream of the turbine means, and wherein mozzle blocking means are provided for selectively closing the exhaust nozzle during ramjet engine operating conditions.

5. Powerplant according to claim 2, wherein
gaseous coolant supply means are provided for filling the turbofan core engine means with gaseous coolant during ramjet engine operating condition.

6. Powerplant according to claim 4, wherein
gaseous coolant supply means are provided for filling the turbofan core engine means with gaseous coolant during ramjet engine operating condition.

7. Powerplant according to claim 2, wherein
the radially outer contour of the fan blades converges in the downstream flow direction,
wherein an engine outer casing is provided which surrounds the fan blade units and includes a first casing section which converges to match the converging contour of the fan blade and a second casing section downstream of the fan blades which diverges radially outwardly in the downstream flow direction, and wherein said first and second casing sections are adjustably movable radially outwardly to form an approximately cylindrical casing contour during ramjet engine operating conditions.

8. Powerplant according to claim 7, wherein
said first and second casing sections are of substantially the same axial length.

9. Powerplant according to claim 8, wherein the area of the engine outer casing over the axial length of the fan blades and the area behind these is formed by two successive rows of front petals and rear petals each pivotally attached to the engine outer casing via pivot bearings respectively, and operated via over or more actuators by way of roller track actuating units and slide shoes which enclose and guide the adjacent central ends of the front petals and rear petals.

10. Powerplant according to claim 2, wherein
the fan blade units include an upstream and a downstream fan blade unit,
wherein the turbine means includes a low pressure turbine directly connected to the upstream fan blade unit and,
wherein reversing and change-speed gear means are provided between the upstream fan blade unit and the downstream fan blade unit.

11. Powerplant according to claim 2,
further comprising a stator vane cascade provided upstream of the first fan blade unit, said stator vane cascade serving simultanously as a front bearing support.

12. Powerplant according to claim 1, wherein
said fan blade units are supported in a fan hub and,
wherein the maximum diameter of the fan hub corresponds to the outer diameter of the core engine.

13. Powerplant according to claim 2, wherein
said fan blade units are supported in a fan hub and,
wherein the maximum diameter of the fan hub corresponds to the outer diameter of the core engine.

14. Powerplant according to claim 2, wherein
said fan blade units are supported in a fan hub and,
wherein the air inlet means follows a convergent course of the rear portion of the fan hub.

15. Powerplant according to claim 1, wherein
the core engine means is a rocket turbine engine which generates propellant gas in a rocket combustion chamber to drive the turbine means.

16. Powerplant according to claim 15, wherein
elbow means 43 and segmented outlets 44 are provided for exhausting the propellant gasses into the bypass flow duct.

17. Powerplant according to claim 15,
further comprising a rocket engine arranged downstream of the rocket turbine engine.

18. Powerplant according to claim 16,
further comprising a rocket engine arranged downstream of the rocket turbine engine.

19. Powerplant according to claim 1, wherein
the turbine means is drivingly connected to a change-speed gear, said change-speed gear serving to drive the two counter-rotating fan blade units.

20. Powerplant according to claim 19, wherein
the change-speed gear includes means to drive the more downstream of the fan blade units at a higher speed than the other one.

21. The Powerplant according to claim 15, wherein
said turbine means comprises high pressure and lower pressure counter-rotating turbine rotors and wherein the high pressure turbine rotor drives the more upstream of the fan blade units and the low pressure turbine rotor drives the other fan blade unit.

22. The Powerplant according to claim 16, wherein
said turbine means comprises high pressure and lower pressure counter-rotating turbine rotors and wherein the high pressure turbine rotor drives the more upstream of the fan blade units and the low pressure turbine rotor drives the other fan blade unit.

* * * * *